(12) United States Patent
Sorbier et al.

(10) Patent No.: US 8,773,134 B2
(45) Date of Patent: *Jul. 8, 2014

(54) LOGGING TOOL SONDE SLEEVE

(75) Inventors: Alice Sorbier, Houston, TX (US); James S. Almaguer, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 137 days.

This patent is subject to a terminal disclaimer.

(21) Appl. No.: 13/157,294

(22) Filed: Jun. 9, 2011

(65) Prior Publication Data

US 2012/0180562 A1  Jul. 19, 2012

Related U.S. Application Data

(63) Continuation of application No. 11/740,981, filed on Apr. 27, 2007, now Pat. No. 7,986,145.

(60) Provisional application No. 60/796,460, filed on May 1, 2006.

(51) Int. Cl.
*G01V 3/18* (2006.01)
*G01V 1/00* (2006.01)

(52) U.S. Cl.
USPC .......................... 324/347; 181/102; 181/110

(58) Field of Classification Search
USPC ............... 324/347, 369, 356, 366, 367, 373; 181/102, 110
See application file for complete search history.

(56) References Cited

U.S. PATENT DOCUMENTS

| 2,404,742 | A | 7/1946 | Polak et al. |
| 2,890,019 | A | 6/1959 | Arps |
| 3,046,474 | A | 7/1962 | Arps |
| 4,575,681 | A | 3/1986 | Grosso et al. |
| 5,134,285 | A | 7/1992 | Perry et al. |
| 5,563,512 | A | 10/1996 | Mumby |
| 6,667,620 | B2 | 12/2003 | Homan et al. |
| 7,071,696 | B2 | 7/2006 | Gambier et al. |
| 7,071,697 | B2 | 7/2006 | Rioufol et al. |
| 2005/0146334 | A1 | 7/2005 | Chen et al. |
| 2005/0218898 | A1 | 10/2005 | Fredette et al. |
| 2006/0054803 | A1 | 3/2006 | Labous et al. |

FOREIGN PATENT DOCUMENTS

| EP | 0654583 | A2 | 5/1995 |
| GB | 2402149 | A | 12/2004 |
| GB | 2404742 | A | 2/2005 |
| GB | 2417089 | A | 2/2006 |
| GB | 2424486 | A | 9/2006 |
| WO | 0047869 | A1 | 8/2000 |
| WO | 0120127 | A1 | 3/2001 |
| WO | 2004001189 | A2 | 12/2003 |
| WO | 2004025308 | A2 | 3/2004 |

*Primary Examiner* — Vincent Q Nguyen
(74) *Attorney, Agent, or Firm* — Kimberly Ballew; Kenneth Liu

(57) ABSTRACT

A logging tool for use in a wellbore having a sensor portion for making measurements. The tool has a sleeve enclosing the sensor portion and made of a material that is transparent to the measurements being made. One or more structural elements having physical characteristics different from the material comprising the sleeve are carried on the sleeve to enhance the mechanical properties of the sleeve.

15 Claims, 6 Drawing Sheets

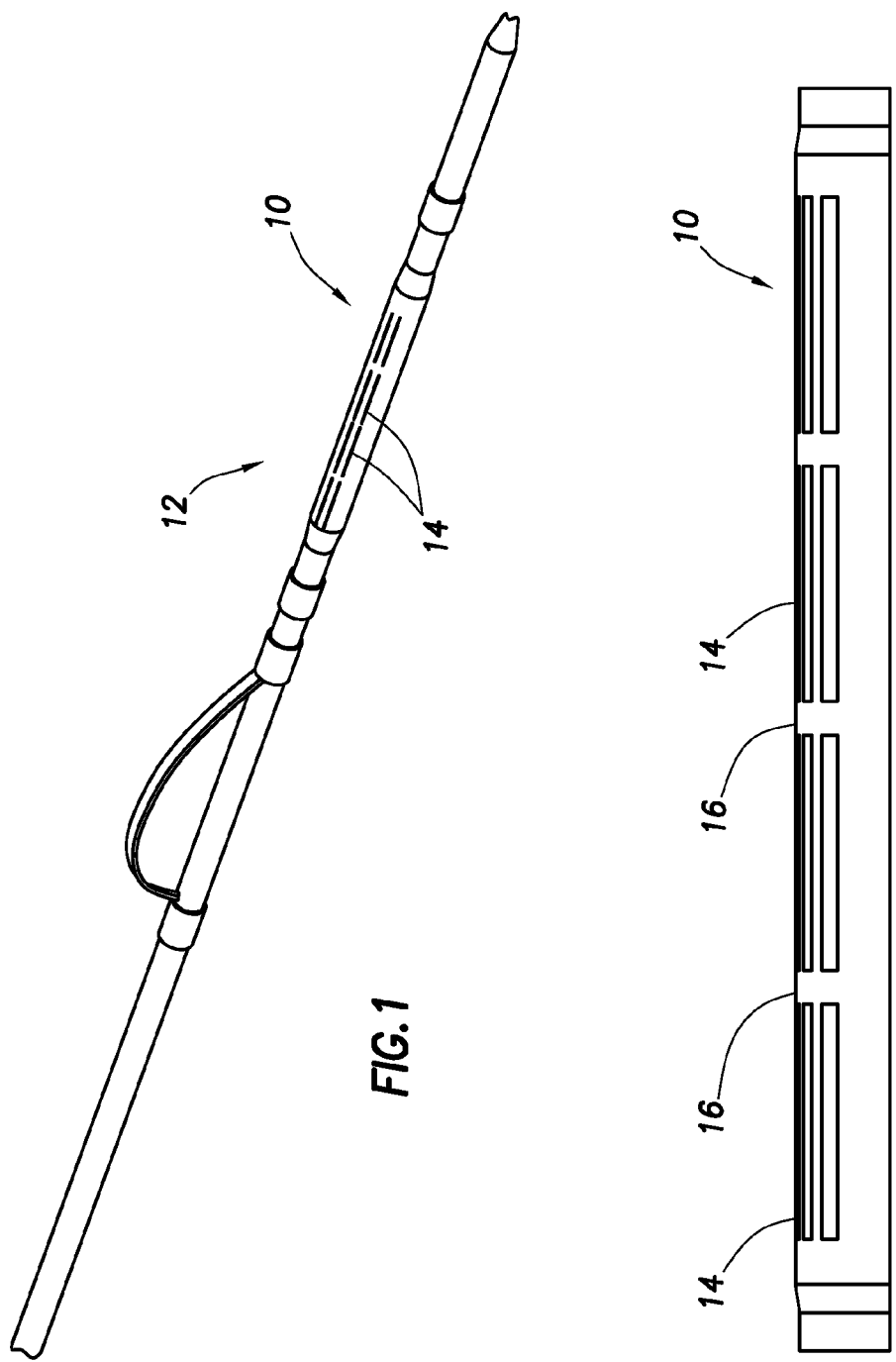

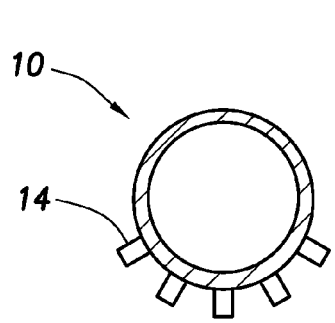 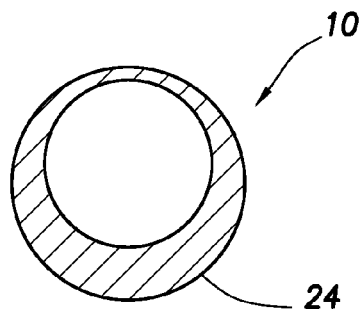
FIG.7b          FIG.7c
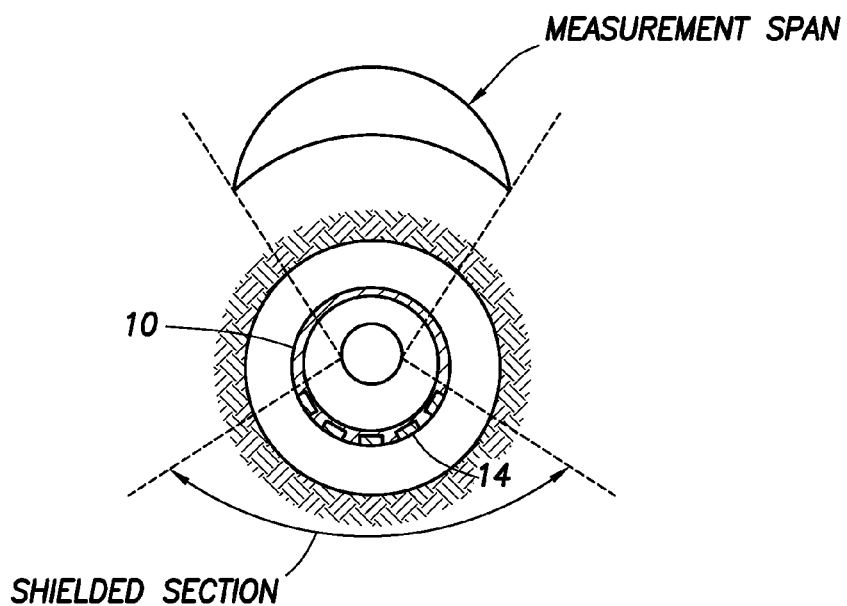
FIG.11

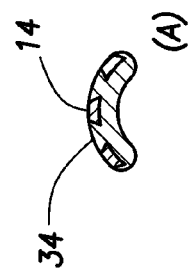
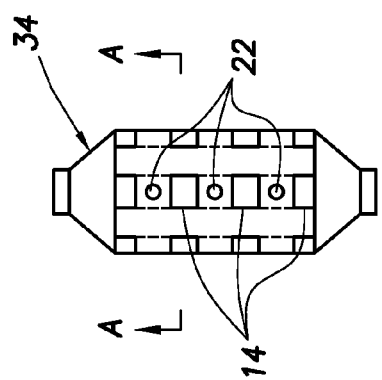
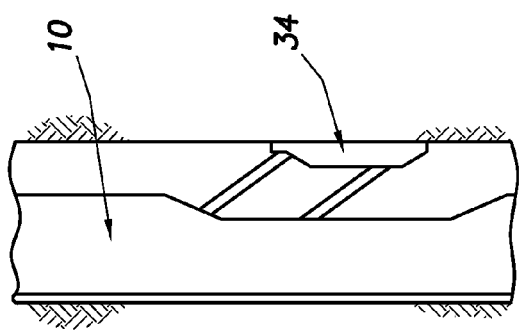
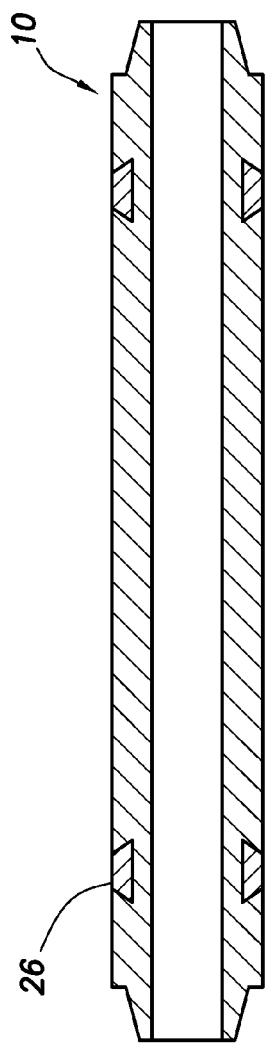

LOGGING TOOL SONDE SLEEVE

CROSS-REFERENCE TO RELATED APPLICATIONS

This application claims priority to and the benefit of, and is a continuation of, U.S. patent application Ser. No. 11/740,981, filed Apr. 27, 2007 now U.S. Pat. No. 7,896,145, which claims priority to and the benefit of U.S. Provisional Application No. 60/796,460, filed May 1, 2006, both applications of which are hereby incorporated by reference herein.

BACKGROUND

1. Field of Invention

The present invention pertains to logging tools for use in a wellbore, particularly logging tools having housings made of soft base material relative to the hardness of the wellbore wall or casing disposed in the wellbore.

2. Related Art

Logging tools are commonly used, in oil and gas exploration, for example, to ascertain or infer properties of the subsurface formations encountered by a wellbore. Logging tools may be used while drilling the wellbore, or may be run into the wellbore after drilling, for example, on a wireline. Various types of logging tools may be run, depending on the measurement type. Such measurement types may include, but are not limited to, resistivity, nuclear magnetic resonance (NMR), gamma ray, spontaneous potential, and dielectric constant.

Generally, the bulk of a logging tool is made of very strong material, such as steel. However, often a portion of the tool contains sensors that must communicate in some way with the surrounding environment. For example, resistivity sensors require electromagnetic signals to pass into and from the formation so that information characterizing the formation properties can be obtained. For the signals to pass into or be received from the formation, the sensors are preferably mounted on an electromagnetically transparent medium. Such transparent media may comprise composite, non-metallic materials. A disadvantage to the composite, non-metallic material is its relative softness compared to the formation or casing. In many cases, that relative softness allows wear and tear of the sleeve to occur at an unacceptable high rate. For example, a NMR tool has powerful magnets that are strongly attracted to the steel casing through which the tool must pass before reaching the uncased portion of the wellbore. The magnetic force causes the tool to be dragged against the casing, causing scraping and wear.

SUMMARY

A logging tool for use in a wellbore having a sensor portion for making measurements. The tool has a sleeve enclosing the sensor portion and made of a material that is transparent to the measurements being made. One or more structural elements having physical characteristics different from the material comprising the sleeve are carried on the sleeve to enhance the mechanical properties of the sleeve.

BRIEF DESCRIPTION OF DRAWINGS

FIG. 1 is a perspective view of a sleeve 10 in a tool assembly according to one embodiment of the present invention.

FIG. 2 is a side view of the sleeve 10 of FIG. 1.

FIG. 3b shows an enlarged view of one of the recessed areas in the reinforcement material of FIG. 3a.

FIG. 7b shows a cross sectional view of a portion of the sleeve 10 of FIG. 7 containing the inserts.

FIG. 7c shows a cross sectional view of an alternative embodiment having a thickened wall on one side.

FIG. 8 is a schematic drawing showing an articulated pad in accordance with one embodiment of the present invention.

FIG. 9 is a schematic drawing of a side view showing one of the pads of FIG. 8.

FIG. 10 is a schematic drawing of a cross sectional view of the pad of FIG. 9.

FIG. 11 is a plan view showing one embodiment according to the present invention in which a portion of the sleeve 10 allows signal to pass and another portion blocks the passage of the signal.

FIG. 13b shows a cross sectional view of the removable standoff ring of FIG. 13a.

FIG. 14 shows an alternate embodiment in which the reinforcement material comprises rings inserted into a sleeve in accordance with the present invention.

DETAILED DESCRIPTION

Figure 3A:
FIG. 3a shows schematically a top view of the reinforcement material in the sleeve 10 of FIG. 1.

The invention pertains to a housing, sleeve, or enclosure 10 for a downhole tool 12 having a sonde or sensor section. The invention protects the tool's interior from the wellbore environment while maintaining a high degree of transparency to measurements being made. To maximize the protection, the enclosure has substantial mechanical integrity such that it is able to maintain its geometry as well as its protective qualities (i.e., resistance to wear and/or physical deterioration) for a substantial period (e.g., many trips in/out of the well). Numerous logging tools contain a sonde or sensor section that needs a housing, sleeve 10, or enclosure that does not impede the propagation or reception of the signal or energy being used for a measurement. Such tools include, but are not limited to; Magnetic Resonance tools, Resistivity tools, Pipe Inspection/Corrosion tools, Radial/Axial/Tangential Cameras, and Magnetometer-based tools. The principle of measurement may include signals or energy from one or more of the following types: electrical, magnetic, electromagnetic, nuclear, acoustic, photo, etc. The present invention allows having such a housing, sleeve 10, cover, etc. (transparent to elements of measurements), but possessing better mechanical integrity.

Referring to FIG. 1, a non-conductive sleeve 10 made of a composite material, for example, is used to enclose the sonde section of a tool 12 that transmits and receives an electromagnetic signal as a basis for its measurement (e.g., magnetic resonance). A strong permanent magnet may be disposed in such a tool 12. In such cases, as the tool 12 passes through a cased section of the well, it is pulled against the casing wall by the attractive magnetic force between the casing and the magnet. The axial sliding of the sleeve 10 against the steel casing while experiencing the substantial attractive transverse force produces significant wear on the sleeve 10. This wear can shorten the life of the sleeve 10, alter its geometry, reduce its mechanical integrity, and reduce its protective qualities against the wellbore environment. The invention, in one embodiment, uses bearing elements 14 (e.g., metallic skids, pads, buttons, etc.) having much tougher mechanical properties than the sleeve 10 base material. The bearing elements are strategically located and embedded in the sleeve 10 base material so as to strengthen the sleeve 10 and protect it against wear. The elements or inserts 14 perform their mechanical function without affecting the physics of the measurement or the placement of the tool 12 in the required section of the wellbore (i.e., non-intrusive geometry). The sleeve 10 can be run on a wireline, in TLC modes (Tough Logging Conditions—pipe conveyed logging) in which mechanical loading is severe, and in D&M assemblies (Drilling and Measurement—Logging While Drilling).

Figure 3B:
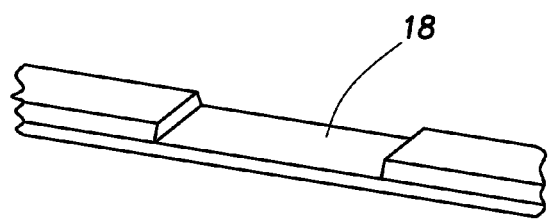
Figure 4:
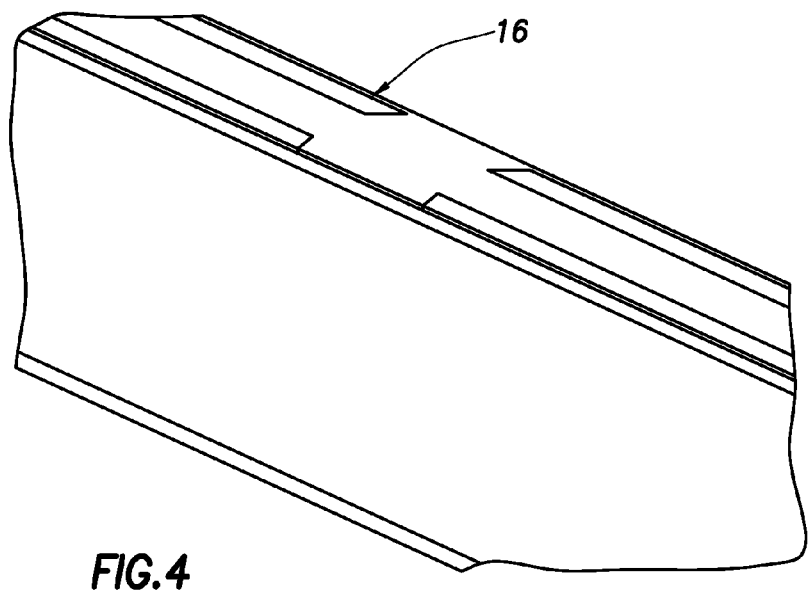
FIG. 4 shows a perspective view of a portion of the sleeve 10 of FIG. 1 in which the recessed area has an overlapping material covering the recessed area.
Figure 5:
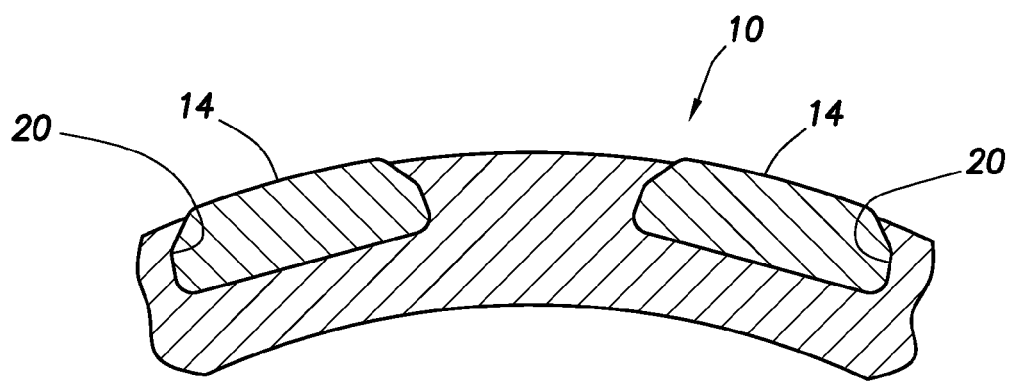
FIG. 5 shows a cross sectional view of a sleeve 10 according to one embodiment of the present invention in which the reinforcement material is an insert disposed in receiving grooves in the sleeve 10.

FIG. 2 shows a sleeve 10 made out of a thermoplastic composite or any electrically non-conductive material that includes several hard and strong inserts 14. The inserts 14 provide wear resistance and strength to the sleeve 10. The inserts 14 cover part or all of the axial length of the sleeve 10 and are positioned around the circumference, covering the sleeve 10 partly or fully. The inserts 14 may include overlaps 16 of the sleeve's material in several locations to secure the inserts 14 onto the sleeve 10. The inserts 14 may have recessed areas 18 to allow for the composite overlap 16, as shown in FIGS. 3b and 4. The thickness of the sleeve 10 may also be increased where the inserts 14 are located such that those areas can provide standoff from the casing or wellbore wall. Alternatively, the insert 14 may be trapped in the sleeve 10 periphery by geometrical constraints 20, as shown in FIG. 5. For example, the insert 14 can have a large chamfer on each side to ensure the inserts 14 are trapped in concave grooves 20 in the sleeve 10.

Figure 6:
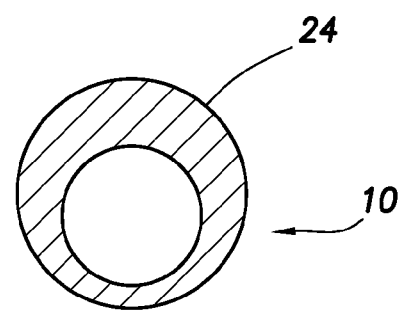
FIG. 6 is a cross sectional view of a housing according to one embodiment of the present invention in which the wall of the housing is thickened on one side.
Figure 12:
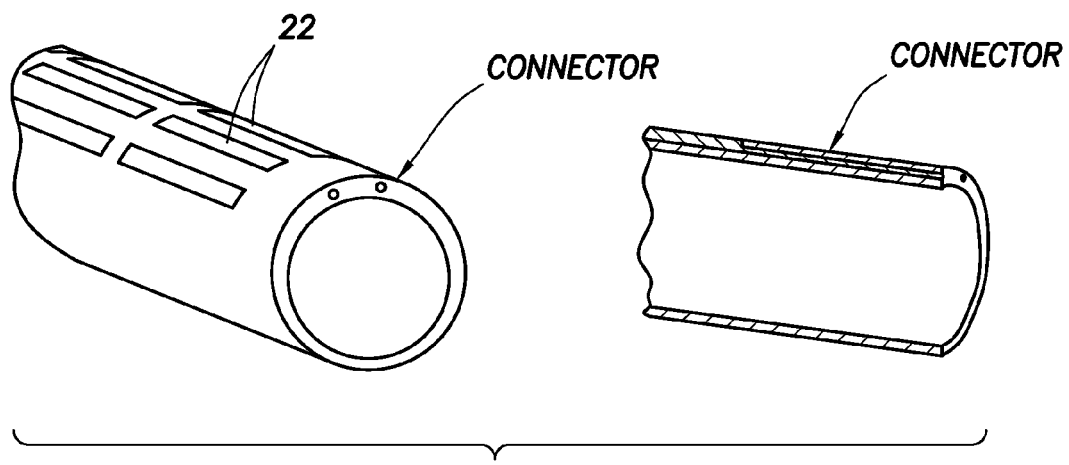
FIG. 12 is a perspective, partially cut away view showing one embodiment according to the present invention in which the sleeve 10 has electrodes disposed therein along with electrical connections to the electrodes.

Other embodiments of the invention may include, singularly, in plurality, or in combination, embedded members 22 that are electrically isolated electrodes used to measure wellbore properties (see FIG. 12). The measurement capability of an electrode 22 may be its primary function or secondary to being a strengthening member. As a strengthening member, improvement in tensile and compressive load bearing capacity may be had since those loads on the sleeve 10 are shared by the stronger elements. Besides having a generally more robust design for normal use, this can be important when running tools on drill pipe or during fishing operations. The inserts 14 can also improve bending strength to withstand loads experienced during transverse loading at the surface or in the well; for example passing through a severe dog-leg. An alternative embodiment to the reinforcement elements 14 is having a section with a thickened wall 24, as shown in FIG. 6. Either embodiment leads to improved collapse resistance by increasing the over-all yield strength to hoop stress. This may be critical if the enclosure is protecting sensitive internal components and the spacing between the enclosure and components is small.

The increased mechanical strength helps preserve the sleeve's outer geometry when subjected to flexure or wear. This is important, for example, in cases in which maintaining the geometric shape of the enclosure is critical to maintaining measurement accuracy or to maintain a mechanical function such as seal integrity or interaction with other parts. In addition, use of reinforcing inserts 14 or thickened wall 24 improves resistance to changes in or degradation of mechanical properties due to temperature. Generally, for most materials, certain mechanical properties are diminished as temperature is elevated. This is especially true for non-metallic materials such as composites, elastomers, etc. Placing reinforcing inserts 14 having higher resistance to thermal effects in strategic areas can increase the enclosure's over-all resistance to thermal effects. This is also true for chemical resistance improvement. Improved shock or impact resistance can also be achieved by the present invention. That is, failures due to high strain rate can be reduced by strategic placement of the reinforcement inserts 14. This may be particularly important at low temperatures (e.g., below 0F) where the elasticity (or modulus of elasticity) of non-metallic materials such as composites, elastomers, etc. decreases dramatically.

A further embodiment forces the tool 12 to self-orient in a certain azimuth or relative heading in the wellbore. By making one sector of the tool 12 heavier, the tool 12 can be forced to orient itself with the heavy side on the low side of the well. This can be achieved by either increasing the wall thickness on one side of the housing 10 (FIG. 6) or by embedding inserts 14 of higher density on the desired heavy side, or both.

Figure 7A:
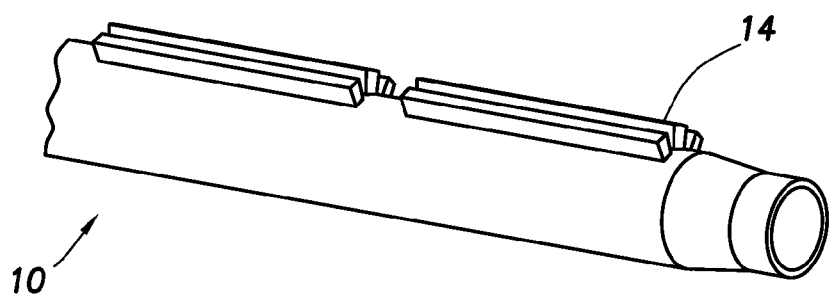
FIG. 7a shows a perspective view according to one embodiment of the present invention in which inserts are disposed asymmetrically around the circumference of the sleeve 10.

The reinforcement inserts 14 can be made to extend beyond the outside diameter of the housing 10, as shown in FIGS. 7a and 7b, to create a desired stand-off (gap) between the tool housing 10 and the wellbore wall. This is particularly important for logging tools whose measurements require a particular stand-off. The embodiment in FIG. 7c achieves the desired stand-off using a thickened wall 24.

In another embodiment (FIG. 14), the reinforcing inserts 14 can be rings 26 that are placed at certain points along the length of the sleeve 10. These rings 26 are positioned along the length of the sleeve 10 in relation to the sensors (not shown) that are located inside the sleeve 10. The number and location of the rings 26 depends on the available space and mechanical requirements. Ultimately, the rings 26 should be placed such that they have minimum interference with the sensor measurement. In particular, it may be desirable to place the reinforcing rings 26 above and below the sensor section.

Figure 13A:
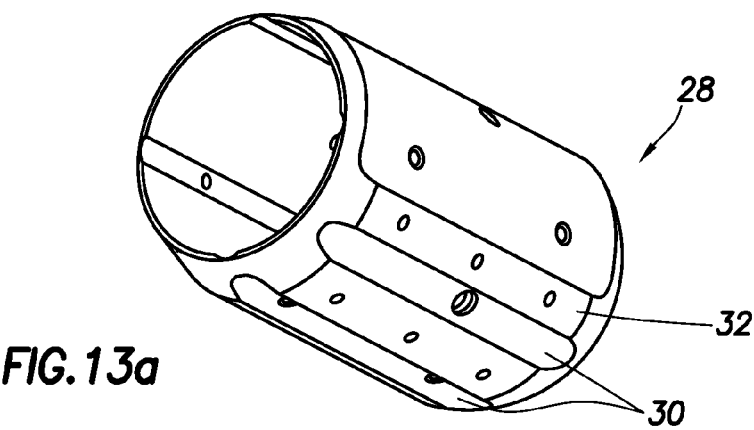
FIG. 13a is a perspective view showing a removable standoff ring constructed in accordance with an alternative embodiment of the present invention
Figure 13B:
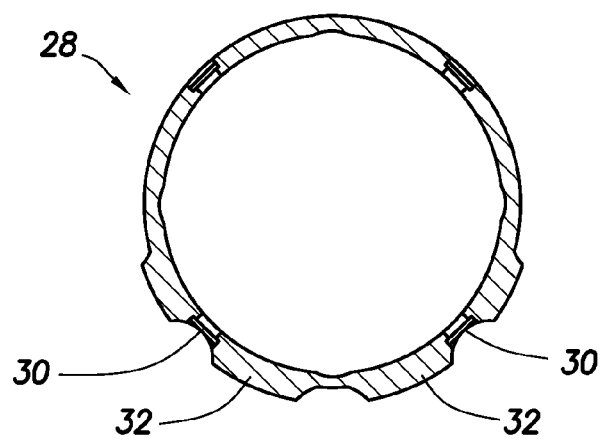

The sleeve 10 can also be protected by standoff sleeves 28 that generate enough space between the sleeve 10 and the borehole wall to prevent or to reduce sleeve wear. An embodiment of such a standoff sleeve 28 is shown in FIGS. 13a and 13b. The standoff sleeve 28 shown in FIGS. 13a and 13b can be designed to generate standoff between the front of the sensor, the back of the sensor, or any other side of the sensor. The standoff sleeve outer surface may be hardened to reduce wear. The stand-off sleeves can carry measurement sensors that are connected to electronics in the tool 12 similar to that shown in FIG. 12.

The standoff sleeve 28 of FIGS. 13a and 13b has grooves 30 between ridges 32. These grooves 30 are designed to facilitate flow of wellbore fluid and cuttings in the annulus of the wellbore. At least one standoff sleeve 28 is needed to generate the gap between the sleeve 10 and the borehole wall. The standoff sleeve 28 may be attached to the logging tool 12 above or below the sensor section. Alternatively, the standoff sleeve 28 may be attached to the sleeve 10 in locations where it would have minimum interference with sensor operations.

In another embodiment, multiple standoff sleeves 28 may be used and placed above and below the sleeve 10, in addition to being deployed on the sleeve 10.

Improved vibration resistance can be achieved using reinforcement inserts 14. The inserts 14 can modify the natural or resonant frequency of an enclosure 10. As such, the resistance to vibrate at a particularly harmful frequency (e.g., during land transport) may be increased by the present invention.

Just as it is important to have measurement transparency in some sections of the housing, sleeve, cover, etc., it may also be important to shield or shunt other sections to block the passage of signal. The invention, as shown in FIG. 11 and disclosed herein, may be implemented using one or more inserts 14, for the purpose of shielding or shunting the signal (emission or reception) from the transmitters and/or sensors. This applies to all previously mentioned principles of measurement.

As mentioned above, in one embodiment the electrically conductive but isolated inserts 14 may be used solely as electrodes 22, or their function may be combined for mechanical purposes. The application for such electrodes 22 or sensor terminals may include, but is not limited to, measuring SP (Spontaneous Potential), making fast-responding well fluid temperature measurements (for example, to detect leaks or inflow), and measurement of well fluid electrical properties such as resistivity (or its inverse, conductivity). There may also be cases in which an electric potential, for example an electrical ground, needs to connect across the non-conductive housing. Conductive inserts 14 may be strategically placed in the non-conductive housing 10 and electrically connected at the required points to make an electrical connection. FIG. 12 shows an embodiment in which a connector is embedded in the sleeve 10 to electrically connect the electrode to, for example, a circuit board.

Situations arise in which the friction between a tool 12 and the wellbore wall needs to be reduced to successfully deploy (lower) the tool 12, particularly when the tool 12 is conveyed by wireline or slickline. Those cases may include high angle wells (say, greater than 45-degrees inclination) and/or wells having high pressure relative to the effective hanging weight of the tool 12. Tools with sondes having non-metallic housings typically have higher coefficients of friction than metallic housings, and hence have a more difficult time descending into the well. In the past, rollers were used to assist deployment. The problem with that option is the risk of failure is increased because the rollers add length to the assembly and increase the number of connections that may fail. That option also adds cost. The present invention can solve the problem because the inserts 14 in the non-metallic housings will reduce the coefficient of friction.

In another embodiment, the present invention may be implemented in logging tools that contain a deployable sensor section 34 (e.g., a pad connected to an articulating mechanism). FIGS. 8-10 show one such embodiment. The inserts 14 may be strategically placed in the pad 34 to improve the mechanical properties of the pad structure, to improve wear resistance, and to serve as sensor electrodes.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A logging tool for use in a wellbore, comprising:
a sensor portion for making measurements within the wellbore, wherein the sensor portion communicates signals with a surrounding environment as a basis for the logging tool measurements;
a non-metallic sleeve comprising a longitudinal axis and enclosing the sensor portion, the non-metallic sleeve being made of a material that is electromagnetically transparent to the measurements being made by the sensor portion; and
one or more structural elements carried by the non-metallic sleeve to enhance the mechanical properties of the non-metallic sleeve, wherein the structural elements are supported about the non-metallic sleeve such that the non-metallic sleeve is positioned laterally between the structural elements and the longitudinal axis,
wherein the one or more structural elements do not affect measurements made by the sensor portion of the tool, and
wherein the one or more structural elements are located inside the non-metallic sleeve.

2. The logging tool of claim 1, further comprising a standoff sleeve.

3. The logging tool of claim 2, wherein the standoff sleeve creates a standoff between the non-metallic sleeve and a wall of the wellbore.

4. The logging tool of claim 2, wherein the standoff sleeve comprises grooves, the grooves being configured to facilitate flow of wellbore fluid and cuttings in an annulus of the wellbore.

5. The logging tool of claim 1, wherein the one or more structural elements comprise physical characteristics different from the material comprising the non-metallic sleeve.

6. The logging tool of claim 5, wherein a thickness of the non-metallic sleeve is increased at a location where structural elements are placed, such that the location provides standoff from a casing or wellbore wall,
wherein the one or more axially elongated structural elements comprise at least one of metallic skids, pads, rings, and buttons,
wherein the non-metallic sleeve material is a composite, plastic, or ceramic,
wherein the one or more structural elements are embedded in the non-metallic sleeve, and
wherein the one or more structural elements modify at least one of a resonant frequency of the non-metallic sleeve and an elasticity of the non-metallic sleeve.

7. The logging tool of claim 1, wherein the one or more structural elements comprise at least one of metallic skids, pads, rings, and buttons.

8. The logging tool of claim 1, wherein the non-metallic sleeve material is a composite, plastic, or ceramic.

9. The logging tool of claim 1, wherein the one or more structural elements are metallic.

10. The logging tool of claim 1, wherein the one or more structural elements are embedded in the non-metallic sleeve.

11. The logging tool of claim 1, wherein the one or more structural elements are disposed inside an outer surface of the non-metallic sleeve.

12. The logging tool of claim 1, wherein the one or more structural elements modify a resonant frequency of the non-metallic sleeve.

13. The logging tool of claim 1, wherein the one or more structural elements modify an elasticity of the non-metallic sleeve.

14. A logging tool for use in a wellbore, comprising:

a sensor portion for making measurements within the wellbore, wherein the sensor portion communicates signals with a surrounding environment as a basis for the logging tool measurements;

a non-metallic sleeve comprising a longitudinal axis and enclosing the sensor portion, the non-metallic sleeve being made of a material that is electromagnetically transparent to the measurements being made by the sensor portion; and one or more structural elements carried on the non-metallic sleeve to enhance the mechanical properties of the non-metallic sleeve, wherein the structural elements are supported about the non-metallic sleeve such that the non-metallic sleeve is positioned circumferentially between the structural elements and the longitudinal axis, wherein the one or more structural elements do not affect measurements made by the sensor portion of the tool, and wherein the one or more structural elements are located inside the non-metallic sleeve.

15. A logging tool for use in a wellbore, comprising:

a sensor portion for making measurements within the wellbore, wherein the sensor portion communicates signals with a surrounding environment as a basis for the logging tool measurements;

a non-metallic sleeve comprising a longitudinal axis and enclosing the sensor portion, the non-metallic sleeve being made of a material that is electromagnetically transparent to the measurements being made by the sensor portion; and one or more structural elements carried on the non-metallic sleeve to enhance the mechanical properties of the non-metallic sleeve, wherein the structural elements are supported about the non-metallic sleeve, wherein the one or more structural elements do not affect measurements made by the sensor portion of the tool, wherein the one or more structural elements are located inside the non-metallic sleeve, and wherein a thickness of the non-metallic sleeve is increased at a location where structural elements are placed, such that the location provides standoff from a casing or wellbore wall.

* * * * *